United States Patent Office 3,091,532
Patented May 28, 1963

3,091,532
VESICULAR IMAGE PHOTOGRAPHY PROCESS WITH POLYKETONE PHOTOGRAPHIC FILMS
John D. Michaelsen, Los Gatos, Calif., assignor to International Business Machines Corporation, New York, N.Y., a corporation of New York
No Drawing. Filed Dec. 30, 1960, Ser. No. 79,584
8 Claims. (Cl. 96—48)

This invention relates to photographic films, their exposure and development. More particularly, the invention relates to films containing, as a photosensitive element, a light decomposable polymer formed from monomers having a low boiling point.

Photographic processes are known wherein polymers, such as polyvinylidene chloride, are degraded on exposure to light to form colored polymers having conjugate unsaturation. Other photographic processes, for example, the processes of United States Patents 2,699,392 and 2,911,299, utilize the nitrogen formed when a diazo compound is exposed to light to form vesicular images.

I have now discovered that certain photodeploymerizable polymers can be utilized in films to form vesicular images. These films differ from the conventional diazo sensitized vesicular image forming films in that in my process one quantum of light forms many monomers which can be utilized to form vesicles, whereas in processes utilizing diazo sensitized films many quanta of light are required per vesicle.

The light decomposable polymers useful in my invention contain multiple units of a monomer having the structural formula

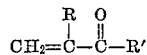

where R is selected from the group consisting of methyl, ethyl and propyl, and R' is selected from the group consisting of secondary and tertiary propyl, butyl and pentyl.

Examples of monomers which have this structural formula include 2,4-dimethyl-1-penten-3-one, 2,4,4-trimethyl-1-penten-3-one, and 2-ethyl-4,4-dimethyl-1-hexen-3-one.

The polyketones utilized in my films can be used alone or can be suspended in a polymeric vehicle. Suitable vehicles include compatible non-halogenated polymers such as polyamides, for example, polyhexamethylene adipamide; polyesters such as polyethylene terephthalate; polyester amides such as hexamethylene adipamide/sebacate; polyacrylates; and alkyd resins.

The polyketone film or a film of polyketone in a vehicle can be coated on a supporting base, or a film can be formed and attached to such a base with adhesives.

Base materials can be flexible or rigid films or sheets. Metal foils, for example, aluminum or tin foils, are especially useful because of their great spatial strength. Other suitable spatially stable base materials can be high polymers such as polystyrene; the linear condensation polymers, such as the polyesters, for example, polyethylene terephthalate; the polyamides, for example, polyhexamethylene sebacamide; polyester amides, for example, polyhexamethylene adipamide-adipate, etc. Fillers or reinforcing agents can be present in the synthetic resin or polymer bases such as the various fibers (synthetic, modified or natural). These fibers include cellulose fibers such as cotton, cellulose acetate, viscose rayon, paper; and glass wool.

Where the polyketones are suspended in a supporting polymer, from about 40 to about 99%, based on the total weight of the photosensitive polymer and the supporting polymer, is required. Preferably from about 70 to about 90% of the photosensitive polymer is incorporated in the supporting polymer. Where no supporting base is utilized, the polymeric films should be from about 5 to about 20 mils and, preferably, from about 10 to about 15 mils thick. Where a supporting base is utilized, the films are from about 0.6 to about 1.5 mils thick and, preferably, from about 1.0 to about 1.2 mils thick.

The films of my invention are utilized by exposing the films to short wave length light, preferably ultraviolet light, from 1 to 30 seconds and, preferably, from 2 to 8 seconds. The exposed film is developed by heating to a temperature of from about 120 to about 160° C. Through the utilization of the above described process, essentially smooth film surfaces are maintained and there are no noticeable undesirable, light reflecting depressions in the film surface.

The following examples more specifically illustrate my invention. However, it is not intended that my invention be limited to the exact compositions and procedures set out. Rather, it is intended that all equivalents to those skilled in the art be included within the scope of my invention as claimed.

Example I

Following the general procedures of Marvel et al. (J.A.C.S. 60, 280–283, 1938) a low molecular weight linear polymer of 2,4-dimethyl-1-penten-3-one is formed. A medium viscosity 5% solution of the polymer in acetone is applied to a polyethylene terephthalate film with a doctor blade to form a 1 mil film when dry. The film is dried at 50–60° C.

Example II

The film of Example I is exposed to irradiation from a 250 W. mercury vapor arc lamp at a distance of about eight inches for a period of 20 seconds. The exposed film is then developed at a temperature of 150–160° C.

I claim:
1. A photographic process comprising:
exposing a film containing a polyketone of the monomer having the structural formula:

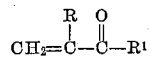

where R is selected from the group consisting of methyl, ethyl and propyl, and $R^1$ is selected from the group consisting of secondary and tertiary propyl, butyl and pentyl to image defining light effective to de-polymerize the polyketone in the exposed area of the film; and
vaporizing the monomer with heat to form a refractive image in the exposed area of the film.

2. The photographic process of claim 1 wherein the photographic film is exposed to short wave length light for a period of from about 1 to about 30 seconds to form a latent image and thereafter heated to a temperature of from about 120 to about 160° C. to develop said latent image.

3. The process of claim 1 wherein the photographic film contains from about 40 to about 100%, based on the total weight of the photosensitive polymer and a supporting polymer, polyketone and the photographic film is exposed to ultraviolet light for a period of from about 1 to about 30 seconds to form a latent image and heated to a temperature of from about 120 to about 160° C. to develop said latent image.

4. The process of claim 3 wherein the polyketone photographic film comprises 100% polyketone.

5. The process of claim 3 wherein the photographic film contains 100% polyketone, is exposed to ultraviolet light from about 2 to about 8 seconds to form a latent image, and is developed by heating to a temperature of from about 120 to about 160° C.

6. The process of claim 4 wherein the polyketone is 2,4-dimethyl-1-penten-3-one.

7. The process of claim 4 wherein the polyketone is a poly-2,4,4-trimethyl-1-penten-3-one.

8. The process of claim 4 wherein the photosensitive element is the compound 2-ethyl-4,4-dimethyl-1-hexen-3-one.

References Cited in the file of this patent

UNITED STATES PATENTS

| | | |
|---|---|---|
| 2,196,714 | Wellman | Apr. 9, 1940 |
| 2,684,341 | Anspon | July 20, 1954 |
| 2,772,159 | Elliott | Nov. 27, 1956 |

OTHER REFERENCES

Ferro Chemical Corp., Box 76, Bedford, Ohio, Technical Bulletin No. 29, pages 1 and 2; recorded in Patent Office Library Aug. 18, 1952.